(12) United States Patent
Bharitkar

(10) Patent No.: US 12,563,339 B2
(45) Date of Patent: Feb. 24, 2026

(54) SIGNAL NORMALIZATION USING LOUDNESS METADATA FOR AUDIO PROCESSING

(71) Applicant: Samsung Electronics Co., Ltd., Suwon-si (KR)

(72) Inventor: Sunil Bharitkar, Stevenson Ranch, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 18/398,821

(22) Filed: Dec. 28, 2023

(65) Prior Publication Data

US 2024/0276143 A1     Aug. 15, 2024

Related U.S. Application Data

(60) Provisional application No. 63/444,324, filed on Feb. 9, 2023.

(51) Int. Cl.
H04R 3/00          (2006.01)
G06N 3/0464      (2023.01)

(52) U.S. Cl.
CPC ............. H04R 3/00 (2013.01); G06N 3/0464 (2023.01); *H04R 2430/01* (2013.01)

(58) Field of Classification Search
CPC .... G06N 3/0464; H04R 2430/01; H04R 3/00; H04R 5/04
USPC .......................................... 381/104–107, 123
See application file for complete search history.

(56) References Cited

U.S. PATENT DOCUMENTS

| | | | | |
|---|---|---|---|---|
| 8,457,321 B2 * | 6/2013 | Daubigny | ................ | H03G 3/02 |
| | | | | 381/28 |
| 9,934,790 B2 | 4/2018 | Baumgarte | | |
| 10,341,770 B2 | 7/2019 | Baumgarte | | |
| 10,958,229 B2 | 3/2021 | Baumgarte et al. | | |

(Continued)

FOREIGN PATENT DOCUMENTS

| | | |
|---|---|---|
| KR | 10-2022-0071954 A | 5/2022 |
| WO | 2022/086196 A1 | 4/2022 |

OTHER PUBLICATIONS

International Search Report and Written Opinion dated Apr. 23, 2024 for International Application PCT/KR2024/001013, from Korean Intellectual Property Office, pp. 1-6, Republic of Korea.

(Continued)

*Primary Examiner* — Lun-See Lao
(74) *Attorney, Agent, or Firm* — Sherman IP LLP; Kenneth L. Sherman; Steven Laut

(57)          ABSTRACT

One embodiment provides a method of signal normalization. The method comprises receiving an input content with a corresponding audio signal, and extracting loudness metadata from an audio signal corresponding to the input content. The method further comprises estimating, using a machine learning model, a peak-level amplitude based on the loudness metadata. The peak-level amplitude represents a maximum linear amplitude of the audio signal over an entire duration of the input content. The method further comprises determining a gain based at least on the peak-level amplitude, and applying the gain to the audio signal. The resulting gain-scaled audio signal is provided to one or more speakers coupled to or integrated in an electronic device for audio playback.

20 Claims, 7 Drawing Sheets

(56)        References Cited

U.S. PATENT DOCUMENTS

| | | | |
|---|---|---|---|
| 11,232,807 B2 * | 1/2022 | Hines | .................. G10L 21/0232 |
| 11,354,088 B2 * | 6/2022 | Alexander | ............. H04B 15/00 |
| 11,533,575 B2 | 12/2022 | Ward et al. | |
| 11,950,069 B2 * | 4/2024 | Ali | ....................... H04R 1/1091 |
| 2010/0250258 A1 | 9/2010 | Smithers et al. | |
| 2015/0332685 A1 | 11/2015 | Bleidt | |
| 2016/0323684 A1 | 11/2016 | Carroll et al. | |
| 2019/0325886 A1 | 10/2019 | Riedmiller et al. | |
| 2020/0314578 A1 * | 10/2020 | Filos | ...................... H04R 3/005 |
| 2021/0265966 A1 * | 8/2021 | Port | ......................... H04R 3/04 |
| 2021/0349683 A1 | 11/2021 | Cremer et al. | |
| 2021/0367574 A1 | 11/2021 | Chon et al. | |
| 2022/0129237 A1 | 4/2022 | Chon et al. | |
| 2022/0165289 A1 | 5/2022 | Stone et al. | |
| 2022/0166397 A1 | 5/2022 | Chung et al. | |
| 2022/0264160 A1 | 8/2022 | Jo et al. | |
| 2023/0023024 A1 | 1/2023 | Riedmiller et al. | |

OTHER PUBLICATIONS

Extended European search report dated Nov. 4, 2025 for European Application 24753499.3, from European Patent Office, pp. 1-11, Munich, Germany.

* cited by examiner

100

REMOTE COMPUTING ENVIRONMENT 130

SERVER 131

STORAGE 132

APPLICATION 133

NETWORK 50

SPEAKER 140

DISPLAY DEVICE 60

ELECTRONIC DEVICE 110

PROCESSOR 111

STORAGE 112

INPUT/OUTPUT 113

SENSOR 114

COMMUNICATIONS 115

APPLICATION 116

SIGNAL NORMALIZATION 200

700

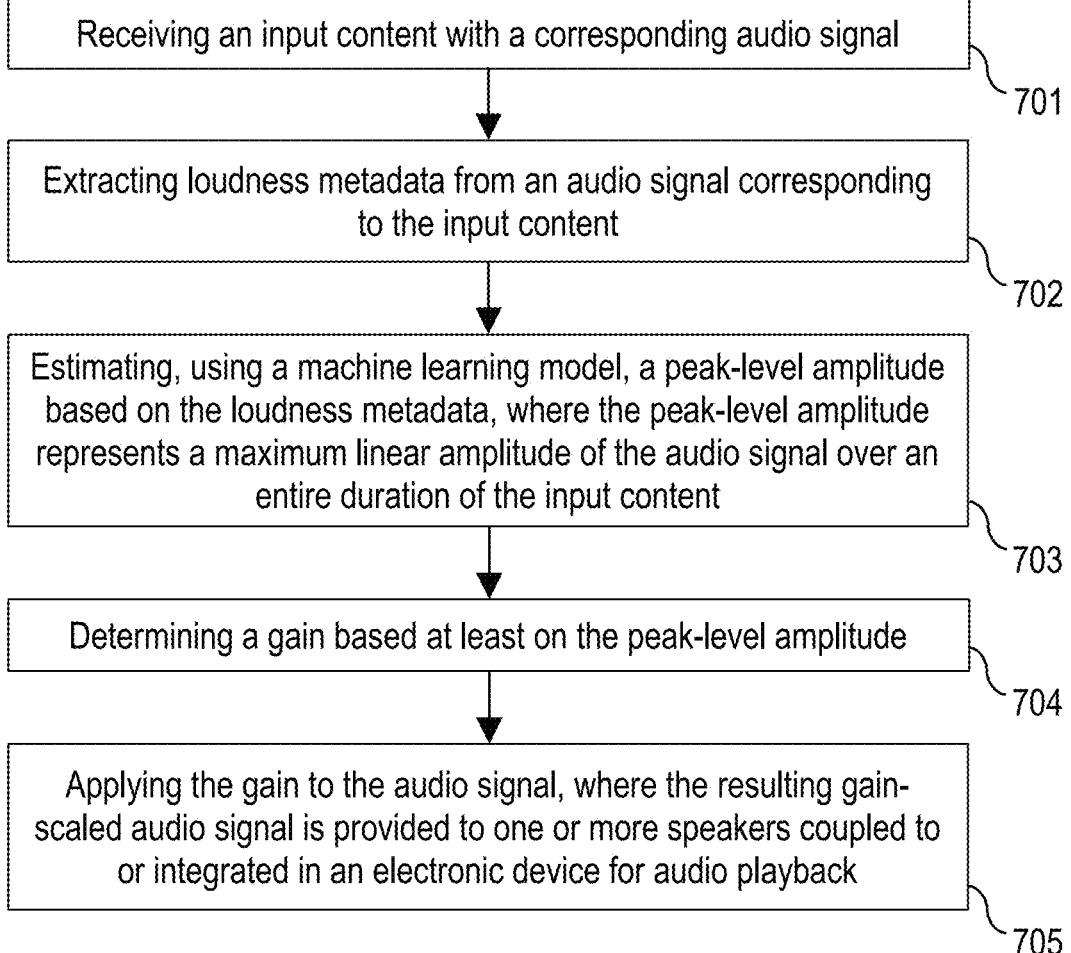

Receiving an input content with a corresponding audio signal
701

Extracting loudness metadata from an audio signal corresponding to the input content
702

Estimating, using a machine learning model, a peak-level amplitude based on the loudness metadata, where the peak-level amplitude represents a maximum linear amplitude of the audio signal over an entire duration of the input content
703

Determining a gain based at least on the peak-level amplitude
704

Applying the gain to the audio signal, where the resulting gain-scaled audio signal is provided to one or more speakers coupled to or integrated in an electronic device for audio playback
705

FIG. 6

SIGNAL NORMALIZATION USING LOUDNESS METADATA FOR AUDIO PROCESSING

CROSS-REFERENCE TO RELATED APPLICATIONS

This application claims the priority benefit of U.S. Provisional Patent Application Ser. No. 63/444,324, filed on Feb. 9, 2023, which is incorporated herein by reference in its entirety.

TECHNICAL FIELD

One or more embodiments generally relate to loudspeaker systems, in particular, a method and system of signal normalization using loudness metadata for audio processing.

BACKGROUND

Audio processing on consumer devices (TVs, soundbars) is used to enhance audio experience for the consumer. Such audio processing includes perceptual bass enhancement, loudspeaker-room equalization, audio upmixing, spatial rendering with head-related transfer functions (HRTF), etc.

SUMMARY

One embodiment provides a method of signal normalization. The method comprises receiving an input content with a corresponding audio signal, and extracting loudness metadata from an audio signal corresponding to the input content. The method further comprises estimating, using a machine learning model, a peak-level amplitude based on the loudness metadata. The peak-level amplitude represents a maximum linear amplitude of the audio signal over an entire duration of the input content. The method further comprises determining a gain based at least on the peak-level amplitude, and applying the gain to the audio signal. The resulting gain-scaled audio signal is provided to one or more speakers coupled to or integrated in an electronic device for audio playback.

Another embodiment provides a system of signal normalization. The system comprises at least one processor and a non-transitory processor-readable memory device storing instructions that when executed by the at least one processor causes the at least one processor to perform operations. The operations include receiving an input content with a corresponding audio signal, and extracting loudness metadata from an audio signal corresponding to the input content. The operations further include estimating, using a machine learning model, a peak-level amplitude based on the loudness metadata. The peak-level amplitude represents a maximum linear amplitude of the audio signal over an entire duration of the input content. The operations further include determining a gain based at least on the peak-level amplitude, and applying the gain to the audio signal. The resulting gain-scaled audio signal is provided to one or more speakers coupled to or integrated in an electronic device for audio playback.

One embodiment provides non-transitory processor-readable medium that includes a program that when executed by a processor performs a method of signal normalization. The method comprises receiving an input content with a corresponding audio signal, and extracting loudness metadata from an audio signal corresponding to the input content. The method further comprises estimating, using a machine learning model, a peak-level amplitude based on the loudness metadata. The peak-level amplitude represents a maximum linear amplitude of the audio signal over an entire duration of the input content. The method further comprises determining a gain based at least on the peak-level amplitude, and applying the gain to the audio signal. The resulting gain-scaled audio signal is provided to one or more speakers coupled to or integrated in an electronic device for audio playback.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 6 is a flowchart of an example process for signal normalization, in one or more embodiments.

DETAILED DESCRIPTION

Figure 1:
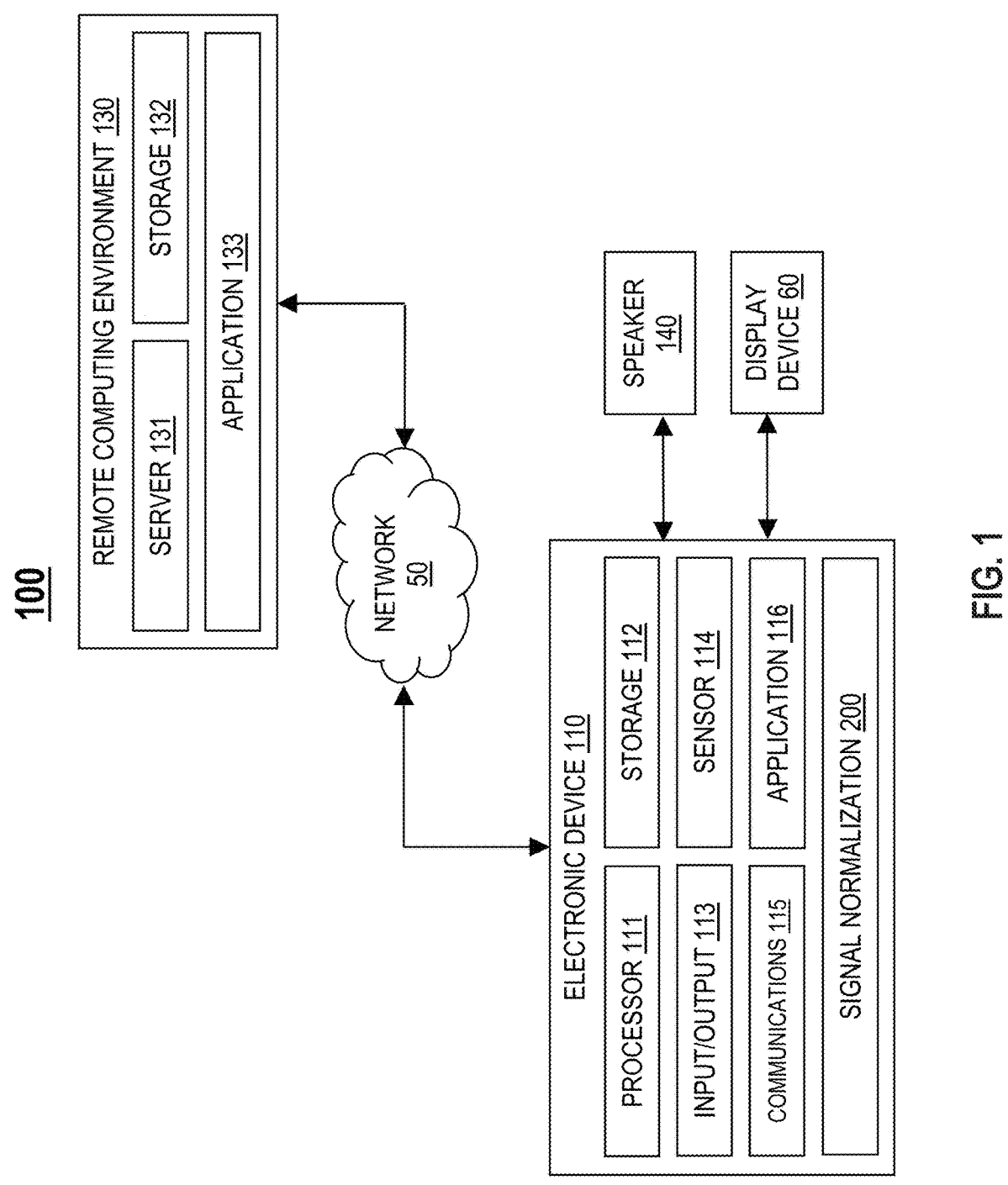
FIG. 1 is an example computing architecture for implementing signal normalization using loudness metadata for audio processing, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to loudspeaker systems, in particular, a method and system of signal normalization using loudness metadata for audio processing. One embodiment provides a method of signal normalization. The method comprises receiving an input content with a corresponding audio signal, and extracting loudness metadata from an audio signal corresponding to the input content. The method further comprises estimating, using a machine learning model, a peak-level amplitude based on the loudness metadata. The peak-level amplitude represents a maximum linear amplitude of the audio signal over an entire duration of the input content. The method further comprises determining a gain based at least on the peak-level amplitude, and applying the gain to the audio signal. The resulting gain-scaled audio signal is provided to one or more speakers coupled to or integrated in an electronic device for audio playback.

Another embodiment provides a system of signal normalization. The system comprises at least one processor and a non-transitory processor-readable memory device storing instructions that when executed by the at least one processor causes the at least one processor to perform operations. The operations include receiving an input content with a corresponding audio signal, and extracting loudness metadata from an audio signal corresponding to the input content. The operations further include estimating, using a machine learning model, a peak-level amplitude based on the loudness metadata. The peak-level amplitude represents a maximum linear amplitude of the audio signal over an entire duration of the input content. The operations further include determining a gain based at least on the peak-level amplitude, and applying the gain to the audio signal. The resulting gain-scaled audio signal is provided to one or more speakers coupled to or integrated in an electronic device for audio playback.

One embodiment provides non-transitory processor-readable medium that includes a program that when executed by a processor performs a method of signal normalization. The method comprises receiving an input content with a corresponding audio signal, and extracting loudness metadata from an audio signal corresponding to the input content. The method further comprises estimating, using a machine learning model, a peak-level amplitude based on the loudness metadata. The peak-level amplitude represents a maximum linear amplitude of the audio signal over an entire duration of the input content. The method further comprises determining a gain based at least on the peak-level amplitude, and applying the gain to the audio signal. The resulting gain-scaled audio signal is provided to one or more speakers coupled to or integrated in an electronic device for audio playback.

To create bass in loudspeaker systems, significant volume displacement is required of loudspeaker drivers which lead to high power requirements, expensive transducer/loudspeaker costs, and the need to embed high quality and expensive power amplifiers in these systems. Some conventional solutions introduce the perception of bass by generating non-linear components of an audio signal (i.e., perceptual bass enhancement (PBE)). For example, generating even and odd harmonics of a 50 Hz audio signal (viz., 100 Hz, 150 Hz, 200 Hz, . . . ) gives the perception of pitch of 50 Hz (evidenced as a difference between adjacent harmonic center frequencies). PBE helps achieve desirable bass performance, while maintaining existing thermal and mechanical limits of transducers, such that transducer/amplifier costs are inexpensive. PBE also improves flexibility for industrial design (ID), product dimensions, purchasing/cost targets, and, in turn, profit margins.

Audio processing on a device typically involves increasing the gain of an audio signal in some or all speaker channels. A device may provide as an audio processing tool an equalization filter configured to: (1) receive, as user input setting one or more equalization parameters, and (2) control, based on the one or more equalization parameters, the reproduction of bass/low frequencies, mid frequencies, or high frequencies via a loudspeaker system integrated in or coupled to the device. For example, if the user input sets the one or more equalization parameters to default values (e.g., 0), a streaming audio signal at 0 dBFS (decibels relative to full scale) (maximum value of the signal in media being constrained to ±g, wherein g=1) will be reproduced by the loudspeaker system without any added distortion. However, if the user input sets the one or more equalization parameters to non-default values, gain is added to the signal, such that the signal will be reproduced by the loudspeaker system with clipping and distortion, especially at bass/low frequencies or mid frequencies.

For example, if a user wants to increase bass sound for a movie displayed on a television, the user may utilize the equalization filter to increase the bass sound (e.g., increasing the bass sound by 10 dB). Increasing the bass sound as such, however, may result in the resulting reproduced audio for the movie being too loud which in turn may cause damage to speakers integrated in or coupled to the television.

In some conventional solutions, a guard-rail or a guard-band is introduced, such that if audio post-processing (e.g., equalization filter) requires an increase in X amount of decibel (dB) gain, then a playback chain attenuates an input audio signal proportionally (e.g., by X dB) before sending the signal to the post-processing. This attenuation is implemented to prevent clipping and distortion of the input audio signal at playback time. These conventional solutions are typically implemented in televisions. These conventional solutions have drawbacks. If the signal is 0 dBFS, a fixed gain/scaling may result in the reproduced audio signal having an acceptably loud volume playback. However, if the signal has a maximum sample value of −15 dBFS, a fixed gain/scaling may result in the reproduced audio signal having an unacceptably low volume playback. For example, if a user utilizes an equalization filter to increase bass sound of an input audio signal (e.g., increasing the bass sound by 10 dB), these conventional solutions will apply −10 dB gain to the entire audio signal, which may result the entire reproduced audio signal being too soft or low in volume (i.e., not loud enough).

In some other conventional solutions, dynamic range compression (DRC) is implemented which involves nonlinear processing to compress an input audio signal before being delivered to a speaker for reproduction. DRC, however, introduces a number of negative audio artifacts associated with the vagaries of parameters used in DRC such as, threshold, compression ratio, and attack and release time constants. The negative audio artifacts may include pumping and other compression artifacts such as, but not limited to, pop and click sounds.

Loudness metadata is information identifying loudness in an audio signal over an entire duration of a content (e.g., streaming media content, such as a movie) corresponding to the audio signal. Loudness metadata may comprise a single number. Streaming media content include loudness metadata either in the container or the audio codec. File-based media include loudness metadata in the header for stereo content. Loudness metadata may represent loudness in an individual speaker channel (i.e., individual channel-based loudness, e.g., Apple® ID3) or over all speaker channels (e.g., ITU-R BS. 1770).

Content creators or content providers may process an audio file corresponding to content (e.g., streaming media content such as a movie) to determine loudness metadata for the audio file, wherein the loudness metadata identifies loudness over the entire duration of the audio file. Loudness metadata for an audio file is akin to an audio fingerprint for the entire duration of the audio file. Let $L_K$ generally denote loudness metadata. For example, for ITU-R BS. 1770, loudness metadata $L_K$ is determined in accordance with equations (1)-(2) provided below:

$$z_i = \frac{1}{T} \int_0^T y_i^2 \, dt, \tag{1}$$

wherein $y_i$ is an input audio signal for the $i^{th}$ speaker channel, and $$L_K = -0.691 + 10 \log_{10} \Sigma_i G_i \cdot z_i \tag{2},$$

wherein $G_i$ is a gain.

One or more embodiments provide a framework for signal normalization using loudness metadata for audio processing. Unlike conventional solutions, the framework is configured to determine an optimal level of loudness that factors into account desired user settings for sound (e.g., user input to increase bass sound by 10 dB), resulting in reproduced audio without negative audio artifacts (e.g., without pop and click sounds). In one embodiment, the framework is configured to extract loudness metadata from an input audio signal to estimate a peak-level amplitude (maximum peak-sample value) over the entire duration of the input audio signal. In one embodiment, the framework utilizes a nonlinear machine learning model to estimate the peak-level amplitude. In one embodiment, the framework determines content-adaptive gain for the input audio signal based in part on the estimated peak-level amplitude to ensure that all content is consistently perceived by a user (e.g., listener, viewer) with substantially the same amount of loudness.

In one embodiment, the framework is implemented as part of loudspeaker systems for televisions, soundbars, speakers, smart speakers, theaters, laptops, tablets, smart phones, etc. For example, the framework may be implemented with PBE and/or all other types of audio post-processing in televisions and soundbars.

In one embodiment, an input audio signal can be gain-scaled to a reference value before any audio post-processing occurs, thereby removing the need for a fixed gain (unlike conventional solutions that use guard-rails).

For expository purposes, the terms "loudspeaker" and "speaker" are used interchangeably in this specification.

FIG. 1 is an example computing architecture 100 for implementing signal normalization using loudness metadata for audio processing, in one or more embodiments. The computing architecture 100 comprises an electronic device 110 including computing resources, such as one or more processor units 111 and one or more storage units 112. One or more applications 116 may execute/operate on the electronic device 110 utilizing the computing resources of the electronic device 110.

In one embodiment, the electronic device 110 receives video content (e.g., streaming video content, etc.) for presentation via a display device 60 integrated in or coupled to the electronic device 110. In one embodiment, the electronic device 110 receives audio content (e.g., streaming audio content, stereo content corresponding to a movie, etc.) for playback via one or more speakers 140 integrated in or coupled to the electronic device 110/display device 60.

In one embodiment, the one or more applications 116 on the electronic device 110 include an on-device automatic audio signal normalization system 200 that facilitates signal normalization of an input audio signal. In one embodiment, the system 200 is implemented as part of a loudspeaker system integrated in or coupled to the electronic device 110/display device 60.

As described in detail later herein, the system 200 is configured to: (1) receive content (e.g., streaming media content) including a corresponding audio signal, (2) extract loudness metadata from a header of the audio signal, (3) estimate, using a machine learning model, a peak-sample value (i.e., peak-level amplitude) based on the loudness metadata, wherein the peak-sample value represents a maximum linear amplitude of the audio signal relative to 0 dBFS over an entire duration of the content, (4) determine a gain to apply to the audio signal based in part on the peak-sample value, and (5) apply the gain to the audio signal, wherein the resulting gain-scaled audio signal is provided to the one or more speakers 140 for audio playback.

The one or more speakers 140 have a corresponding loudspeaker setup (i.e., speaker configuration) (e.g., stereo, 5.1 surround sound, 7.1 surround sound, 7.1.4 immersive audio, etc.). Examples of a speaker 140 include, but are not limited to, a surround speaker, a height speaker, an upward driving speaker, an immersive speaker, a speaker of the display device 60 (e.g., a TV speaker), a soundbar, a pair of headphones or earbuds, etc.

The electronic device 110 represents a client device at a consumer end. Examples of an electronic device 110 include, but are not limited to, a media system including an audio system, a media playback device including an audio playback device, a television (e.g., a smart television), a mobile electronic device (e.g., an optimal frame rate tablet, a smart phone, a laptop, etc.), a wearable device (e.g., a smart watch, a smart band, a head-mounted display, smart glasses, etc.), a gaming console, a video camera, a media playback device (e.g., a DVD player), a set-top box, an Internet of Things (IOT) device, a cable box, a satellite receiver, etc.

In one embodiment, the electronic device 110 comprises one or more sensor units 114 integrated in or coupled to the electronic device 110, such as a camera, a microphone, a GPS, a motion sensor, etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a keyboard, a keypad, a touch interface, a touch screen, a knob, a button, a display screen, etc. In one embodiment, a user can utilize at least one I/O unit 113 to configure one or more user settings, configure one or more parameters, provide user input, etc.

In one embodiment, the one or more applications 116 on the electronic device 110 may further include one or more software mobile applications loaded onto or downloaded to the electronic device 110, such as an audio streaming application, a video streaming application, etc.

In one embodiment, the electronic device 110 comprises a communications unit 115 configured to exchange data with a remote computing environment, such as a remote computing environment 130 over a communications network/connection 50 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 50. The communications unit 115 may be operative to interface with a communications network using any suitable communications protocol such as, for example, Wi-Fi (e.g., an IEEE 802.11 protocol), Bluetooth®, high frequency systems (e.g., 900 MHZ, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 130 includes computing resources, such as one or more servers 131 and one or more storage units 132. One or more applications 133 that provide higher-level services may execute/operate on the remote computing environment 130 utilizing the computing resources of the remote computing environment 130.

In one embodiment, the remote computing environment 130 provides an online platform for hosting one or more online services (e.g., an audio streaming service, a video streaming service, etc.) and/or distributing one or more applications. For example, an application 116 (e.g., the system 200) may be loaded onto or downloaded to the electronic device 110 from the remote computing environment 130 that maintains and distributes updates for the application 116. As another example, a remote computing environment 130 may comprise a cloud computing environment providing shared pools of configurable computing system resources and higher-level services.

Figure 2:
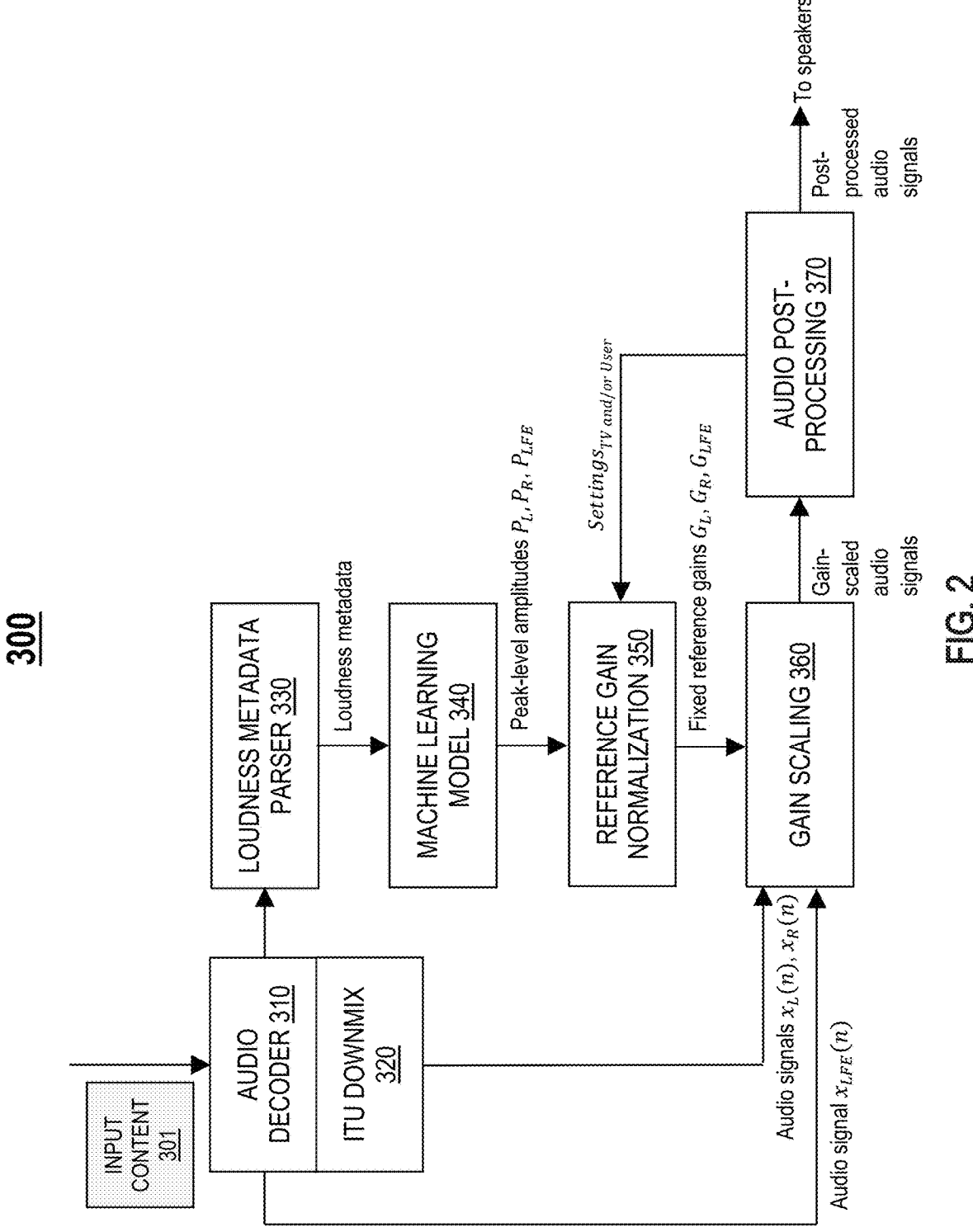
FIG. 2 illustrates an example on-device automatic audio signal normalization system, in one or more embodiments.

FIG. 2 illustrates an example on-device automatic audio signal normalization system 300, in one or more embodiments. In one embodiment, an on-device automatic audio signal normalization system 200 (FIG. 1) executing/running on an electronic device 110 (FIG. 1) is implemented as the system 300. The system 300 implements on-device (i.e., on a client device) automatic audio signal normalization.

The system 300 is configured to receive at least the following inputs: (1) an input content 301 for presentation/playback on an electronic device 110 (e.g., streaming media content from a remote computing environment 130), (2) one or more desired user settings for sound (e.g., received via one or more I/O units 113 of the electronic device 110), and (3) one or more device settings representing a preset configuration for the electronic device 110/one or more speakers 140 (e.g., TV settings such as acceptable range of amplitude).

In one embodiment, the system 300 comprises an audio decoder 310 configured to: (1) receive an input content 301, (2) decode encoded audio included in the input content 301, resulting in a decoded audio signal corresponding to the input content 301, and (3) generate an audio signal $X_{LFE}(n)$ for the Low Frequency Effects channel.

In one embodiment, the system 300 comprises an International Telecommunication Union (ITU) downmix unit 320 configured to: (1) receive an input content 301, and (2) generate a stereo downmix of native audio mix included in the input content 301, resulting in audio signals $x_L(n)$ and $x_R(n)$ for the Left channel and the Right channel, respectively.

In one embodiment, the system 300 comprises a loudness metadata parser 330 configured to: (1) receive a decoded audio signal corresponding to an input content 301 (e.g., from the audio decoder 310), and (2) extract loudness metadata corresponding to the input content 301 from a header of the decoded audio signal.

In one embodiment, the system 300 comprises a machine learning model 340 configured to: (1) receive, as input, loudness metadata corresponding to an input content 301 (e.g., from loudness metadata parser 330), and (2) estimate a peak-sample value $P_i$ (i.e., peak-level amplitude) for an entire duration of the input content 301 based on the loudness metadata (i.e., peak amplitude estimation). The peak-sample value $P_i$ represents a maximum linear amplitude of a decoded audio signal (corresponding to the input content 301) relative to 0 dBFS over the entire duration of the input content 301. Based on the loudness metadata, the machine learning model 340 estimates the maximum linear amplitude without analyzing the entire decoded audio signal.

In one embodiment, if the loudness metadata represents loudness in each individual speaker channel (or over all speaker channels), the machine learning model 340 maps the loudness to a peak-sample value (i.e., peak-level amplitude) over individual channel-based (or over all speaker channels). If the loudness metadata represents loudness in a single individual speaker channel instead (i.e., there is only a single loudness value available in the loudness metadata), the machine learning model 340 maps the loudness to a distribution of peak-sample values (i.e., peak-level amplitudes). Therefore, the machine learning model 340 maps loudness in at least one speaker channel to at least one peak-level amplitude over the at least one speaker channel.

For example, some content streaming platforms or content streaming applications (e.g., YouTube) provide input content 301 with only a single loudness value available in corresponding loudness metadata. The system 300 utilizes a distribution learning model to measure loudness in an input content 301 with only a single loudness value available in corresponding loudness metadata. Specifically, the system 300 utilizes a machine learning model 340 that is trained to receive, as input, the single loudness value, and provide, as output, a distribution of peak-level amplitudes along predetermined bin-edges (e.g., in dB on the x-axis, in number of instances on the y-axis) normalized using a softmax function constrained in [0,1]. The system 300 then extracts the highest non-zero (in dB) value of the distribution to estimate a peak-level amplitude of the input content 301.

In one embodiment, the machine learning model 340 maps loudness in the Left channel, the Right channel, and the LFE channel to peak-sample values (i.e., peak-level amplitudes) $P_L$, $P_R$, and $P_{LFE}$, respectively. Peak-sample values (i.e., peak-level amplitudes) $P_L$, $P_R$, and $P_{LFE}$ represent maximum linear amplitudes of audio signals in the Left channel, the Right channel, and the LFE channel, respectively, relative to 0 dBFS over an entire duration of the input content 301.

In one embodiment, the machine learning model 340 comprises a least-squares (Lsq) optimal model.

In one embodiment, the machine learning model 340 comprises a linear regression (Lreg) model.

In one embodiment, the machine learning model 340 comprises a nonlinear regression (Nreg) model.

In one embodiment, the machine learning model 340 comprises a fully-connected feed-forward neural network (FCNN). Compared to the Lsq optimal model, the Lreg model, and the Nreg model, the FCNN is the best performing model. In one embodiment, the FCNN is trained using an individual channel-based loudness (e.g., Apple® iTunes®) to single-channel loudness (e.g., YouTube®) dataset in which loudness is measured using ITU-R BS. 1770 over multichannel content.

In one embodiment, the system 300 utilizes different machine learning models 340 for different streaming applications.

In one embodiment, the system 300 utilizes different machine learning models 340 for different types of input content 301 (e.g., music, movie, advertisements, news, etc.) to better match audio mixing preferences for different types of input content 301.

In one embodiment, the system 300 utilizes different machine learning models for different genres of input content 301 (e.g., movie genres, music genres, etc.).

In one embodiment, the system 300 comprises a reference gain normalization unit 350 configured to: (1) receive an estimated peak-sample value (i.e., peak-level amplitude) $P_i$ for an entire duration of an input content 301 (e.g., from the machine learning model 340), and (2) determine, based on the estimated peak-sample value, a fixed reference gain $G_i$ to apply to a decoded audio signal corresponding to the input content 301 so that the decoded audio signal is perceived consistently for a given audio post-process (e.g., PBE, equalization, etc.). The fixed reference gain $G_i$ is a content-adaptive gain that ensures that the decoded audio signal is consistently perceived by a user (e.g., listener, viewer) with substantially the same amount of loudness.

In one embodiment, the fixed reference gain $G_i$ (in units of dB) is determined in accordance with equation (3) provided below:

$$G_i = -\text{Settings}_{TV\ and/or\ User} + P_i, \tag{3}$$

wherein $\text{Settings}_{TV\ and/or\ User}$ comprises device settings (e.g., TV settings) and/or desired user settings for sound (e.g., increasing the bass sound by 10 dB). In one embodiment, different audio post-processes (e.g., PBE, equalization, etc.) to be applied to an audio signal before playback may have different desired user settings, result in different $\text{Settings}_{TV\ and/or\ User}$ for different audio post-processes.

In one embodiment, the reference gain normalization unit 350 determines fixed reference gains $G_L$, $G_R$, and $G_{LFE}$ (in units of dB) for audio signals $x_L(n)$, $x_R(n)$, and $X_{LFE}(n)$ for the Left channel, the Right channel, and the LFE channel, respectively, in accordance with equations (4)-(6) provided below:

$$G_L = -\text{Settings}_{TV\ and/or\ User} + P_L, \tag{4}$$

$$G_R = -\text{Settings}_{TV\ and/or\ User} + P_R, \text{ and} \tag{5}$$

$$G_{LFE} = -\text{Settings}_{TV\ and/or\ User} + P_{LFE}. \tag{6}$$

In one embodiment, the system 300 comprises a gain scaling unit 360 configured to: (1) receive a fixed reference gain $G_i$ for a decoded audio signal corresponding to an input content 301 (e.g., from the reference gain normalization unit 350), and (2) apply the fixed reference gain $G_i$ to the decoded audio signal, resulting in a gain-scaled audio signal that will be perceived consistently for a given audio post-process (e.g., PBE, equalization, etc.). In one embodiment, the gain scaling unit 360 receives and applies fixed reference gains $G_L$, $G_R$, and $G_{LFE}$ to audio signals $x_L(n)$, $x_R(n)$, and $X_{LFE}(n)$ for the Left channel, the Right channel, and the LFE channel, respectively.

In one embodiment, the system 300 comprises an audio post-processing unit 370 configured to: (1) receive a gain-scaled audio signal corresponding to an input content 301 (e.g., from the gain scaling unit 360), and (2) apply one or more audio post-processes to the audio signal before playback of the signal (via the electronic device 110). Examples of audio post-processes include, but are not limited to, PBE, equalization, audio upmixing, spatial rendering, digital-to-analog (D/A) conversion, etc. The resulting post-processed audio signal is provided to one or more speakers 140 of the electronic device 110 for audio playback.

For example, if a desired user setting is to increase bass sound by 10 dB, a resulting post-processed audio signal after equalization will have an increased bass sound with non-bass audio being loud enough and without pop or click sounds during playback.

One or more embodiments of the system 300 may be integrated into, or implemented as part of, a loudspeaker control system or a loudspeaker management system. One or more embodiments of the system 300 may be implemented in soundbars with satellite speakers (surround/height speakers). One or more embodiments of the system 300 may be implemented in TVs for use in combination with soundbars and surround/height speakers.

Figure 3:
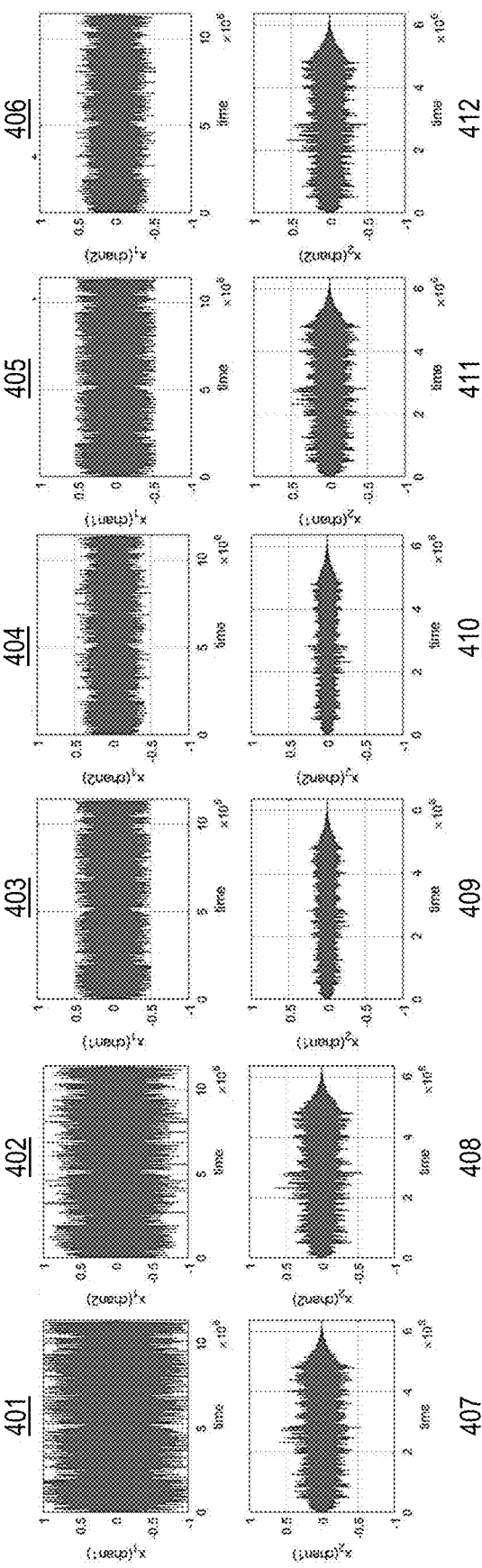
FIG. 3 illustrates example graph plots comparing perceived loudness when using either fixed gain reduction or loudness metadata-based gain reduction, in one or more embodiments.

FIG. 3 illustrates example graph plots 401-412 comparing perceived loudness when using either fixed gain reduction or loudness metadata-based gain reduction, in one or more embodiments. A horizontal axis of each graph plot 401-412 represents time expressed in seconds (s). A vertical axis of each graph plot 401-412 represents the music signal linear amplitude (e.g., voltage). With respect to a first music track $(x_1)$, FIG. 3 includes: (1) graph plots 401 and 402 representing signal in a first speaker channel (chan1) and a second speaker channel (chan2), respectively, during playback of the first music track without gain, (2) graph plots 403 and 404 represent signals in the first speaker channel and the second speaker channel, respectively, during playback of the first music track with fixed gain reduction (i.e., obtained using a conventional solution that utilizes guard-rails), and (3) graph plots 405 and 406 represent signals in the first speaker channel and the second speaker channel, respectively, during playback of the first music track with loudness metadata-based gain reduction (i.e., obtained using the system 300).

With respect to a second music track $(x_2)$, FIG. 3 includes: (1) graph plots 407 and 408 representing signals in the first speaker channel and the second speaker channel, respectively, during playback of the second music track without gain, (2) graph plots 409 and 410 represent signals in the first speaker channel and the second speaker channel, respectively, during playback of the second music track with fixed gain reduction, and (3) graph plots 411 and 412 represent signals in the first speaker channel and the second speaker channel, respectively, during playback of the second music track with loudness metadata-based gain reduction.

As shown in FIG. 3, fixed gain reduction causes significant attenuation which in turn results in loudness reduction. By comparison, loudness metadata-based gain reduction causes insignificant attenuation.

Figure 4:
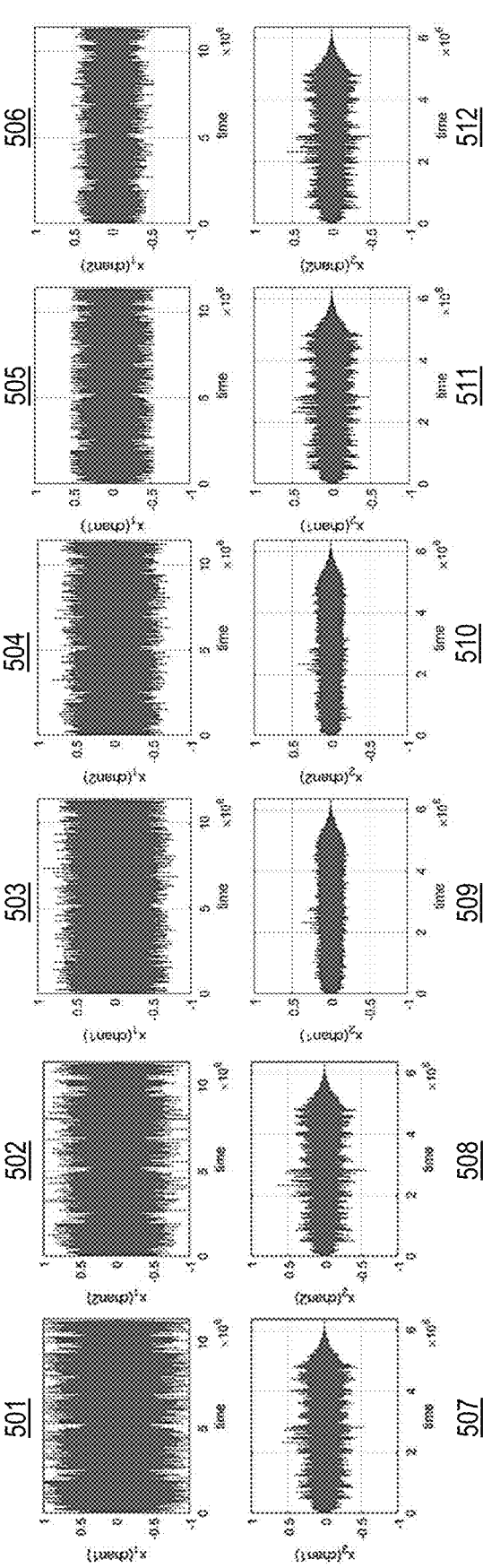
FIG. 4 illustrates example graph plots comparing signals when using either dynamic range compression (DRC) or loudness metadata-based gain reduction, in one or more embodiments.

FIG. 4 illustrates example graph plots 501-512 comparing signals when using either DRC or loudness metadata-based gain reduction, in one or more embodiments. A horizontal axis of each graph plot 501-512 represents time expressed in seconds (s). A vertical axis of each graph plot 501-512 represents loudness expressed in dB. With respect to the first music track $(x_1)$, FIG. 4 includes: (1) graph plots 501 and 502 representing signals in a first speaker channel (chan1) and a second speaker channel (chan2), respectively, during playback of the first music track without gain, (2) graph plots 503 and 504 represent signals in the first speaker channel and the second speaker channel, respectively, during playback of the first music track with DRC (i.e., obtained using a conventional solution that utilizes DRC), and (3) graph plots 505 and 506 represent signals in the first speaker channel and the second speaker channel, respectively, during playback of the first music track with loudness metadata-based gain reduction (i.e., obtained using the system 300).

With respect to the second music track ($x_2$), FIG. 4 includes: (1) graph plots 507 and 508 representing signals in the first speaker channel and the second speaker channel, respectively, during playback of the second music track without gain, (2) graph plots 509 and 510 represent signals in the first speaker channel and the second speaker channel, respectively, during playback of the second music track with DRC, and (3) graph plots 511 and 512 represent signals in the first speaker channel and the second speaker channel, respectively, during playback of the second music track with loudness metadata-based gain reduction.

As shown in FIG. 4, DRC causes dynamic range loss which in turn results in compression artifacts and poor sounding mix (i.e., loud sounds are compressed (made softer) and soft sounds are made louder, thereby changing the artistic/creative intent). By comparison, loudness metadata-based gain reduction causes no dynamic range loss.

Table 1 below presents examples of perceived loudness (in units of dB) during playback of the first music track and the second music track when using fixed gain reduction, DRC, or loudness metadata-based gain reduction.

TABLE 1

| Input Content | Loudness (without gain) | Loudness (with fixed gain reduction) | Loudness (with DRC) | Loudness (with loudness metadata-based gain reduction) |
|---|---|---|---|---|
| First music track ($x_1$) | −14 | −20 | −16.4 | −19.4 |
| Second music track ($x_2$) | −21 | −27 | −21.5 | −22.05 |

As shown in Table 1, with loudness metadata-based gain reduction, the difference in perceived loudness between the first music track and the second music track is closer compared to fixed gain reduction and DRC, thereby ensuring that loudness is maintained when gain is normalized to a fixed reference.

Table 2 below presents examples of loudness metadata (hex to numeric value) and peak-level amplitudes (in units of dB) estimated using a FCNN as a machine learning model 340.

TABLE 2

| Input Content | Loudness metadata | Peak-level amplitude estimation re: 0 dBFS |
|---|---|---|
| First music Track ($x_1$) in the first speaker channel (chan1) | 32767 | −0.6 dB |
| First music Track ($x_1$) in the second speaker channel (chan2) | 31693 | −0.3 dB |
| Second music Track ($x_2$) in the first speaker channel (chan1) | 12978 | −5.32 dB |
| Second music Track ($x_2$) in the second speaker channel (chan2) | 13549 | −5.32 dB |

Figure 5:
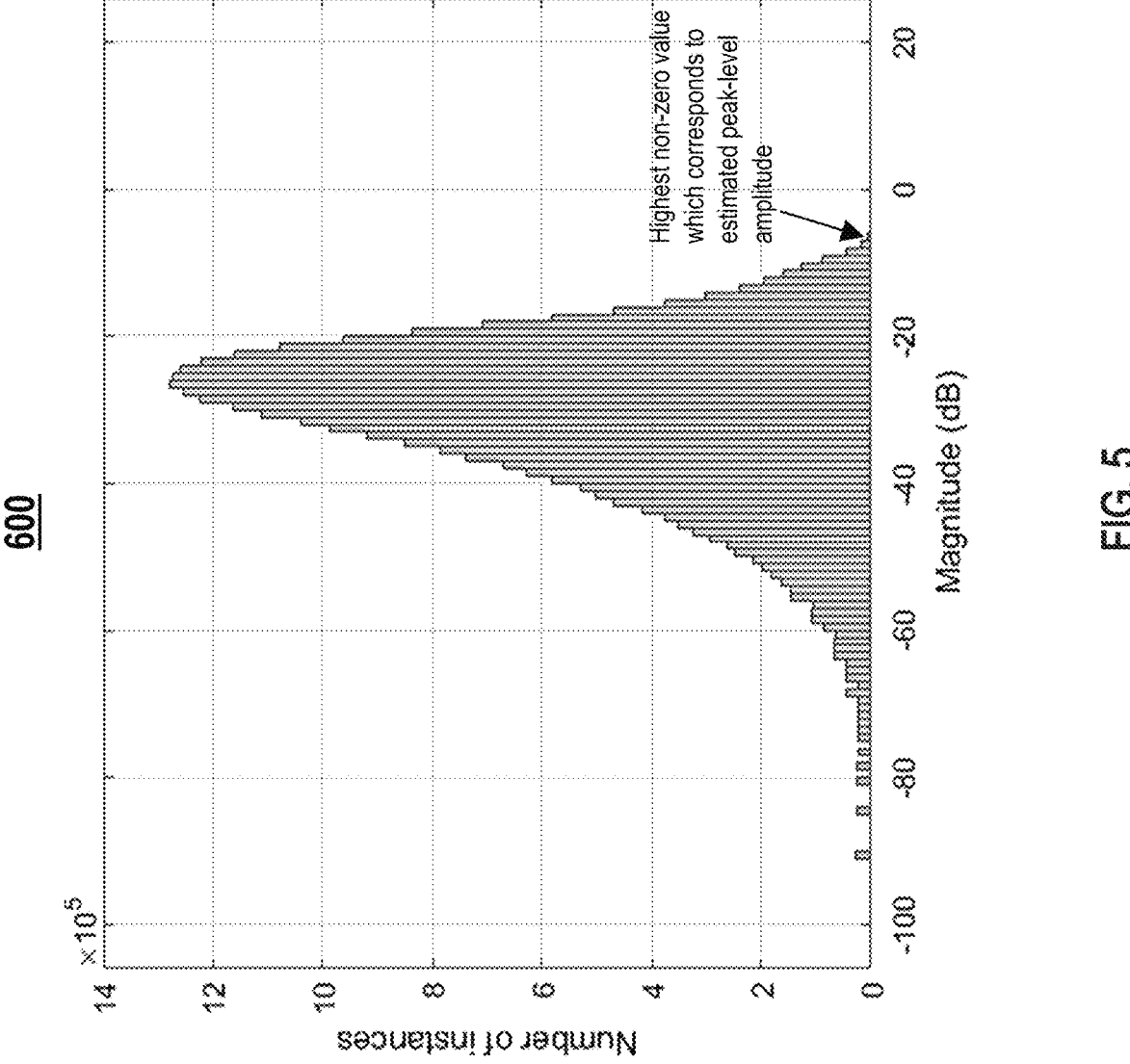
FIG. 5 illustrates an example graph plot showing a distribution of peak-level amplitudes over two speaker channels, in one or more embodiments.

FIG. 5 illustrates an example graph plot 600 showing a distribution of peak-level amplitudes over two speaker channels, in one or more embodiments. A horizontal axis of the graph plot 600 represents magnitude expressed in dB. A vertical axis of the graph plot 600 represents a number of instances. As stated above, the system 300 utilizes a distribution learning model to measure loudness in an input content 301 with only a single loudness value available in corresponding loudness metadata. Specifically, the system

300 utilizes a machine learning model 340 that is trained to receive, as input, the single loudness value, and provide, as output, a distribution of peak-level amplitudes, as shown in FIG. 5. The system 300 then extracts the highest non-zero (in dB) value of the distribution to estimate a peak-level amplitude of the input content 301.

FIG. 6 is a flowchart of an example process 700 for signal normalization, in one or more embodiments. Process block 701 includes receiving an input content with a corresponding audio signal. Process block 702 includes extracting loudness metadata from an audio signal corresponding to the input content. Process block 703 includes estimating, using a machine learning model, a peak-level amplitude based on the loudness metadata, wherein the peak-level amplitude represents a maximum linear amplitude of the audio signal relative to 0 dBFS over an entire duration of the input content. Process block 704 includes determining a gain based at least on the peak-level amplitude. Process block 705 includes applying the gain to the audio signal, wherein the resulting gain-scaled audio signal is provided to one or more speakers coupled to or integrated in an electronic device for audio playback.

In one embodiment, process blocks 701-705 may be performed by one or more components of the system 300.

Figure 7:
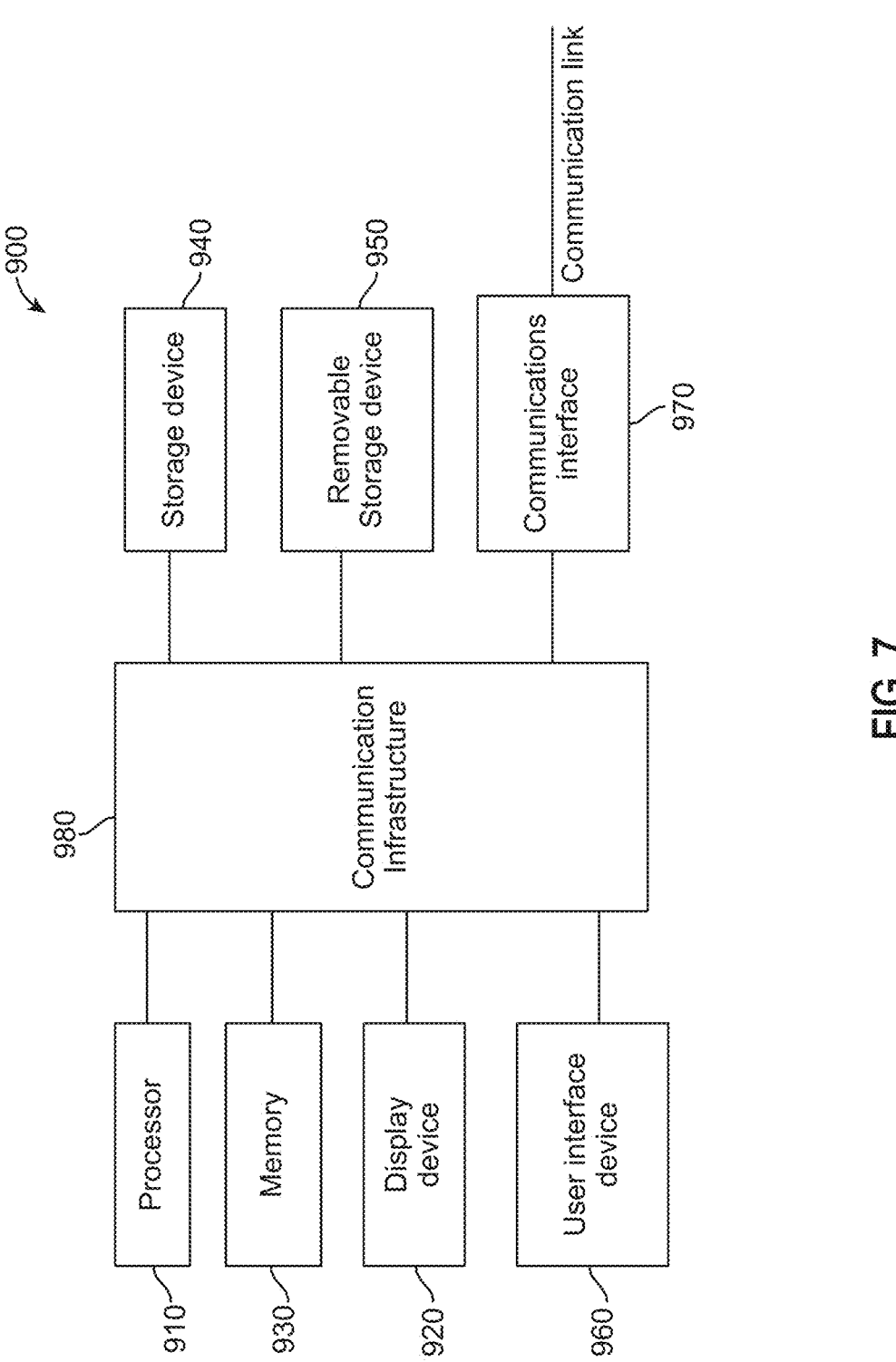
FIG. 7 is a high-level block diagram showing an information processing system comprising a computer system useful for implementing the disclosed embodiments.

FIG. 7 is a high-level block diagram showing an information processing system comprising a computer system 900 useful for implementing the disclosed embodiments. The systems 200, 300, and 400 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electro-magnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 700 (FIG. 6) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method of signal normalization, comprising:
receiving an input content with a corresponding audio signal;
extracting loudness metadata from an audio signal corresponding to the input content;
estimating, using a machine learning model, a peak-level amplitude based on the loudness metadata, wherein the peak-level amplitude represents a maximum linear amplitude of the audio signal over an entire duration of the input content;
determining a gain based at least on the peak-level amplitude; and
applying the gain to the audio signal, wherein the resulting gain-scaled audio signal is provided to one or more speakers coupled to or integrated in an electronic device for audio playback.

2. The method of claim 1, further comprising:
obtaining one or more desired user settings for the electronic device; and
obtaining one or more device settings representing a preset configuration of the electronic device.

3. The method of claim 2, wherein the gain is further based on at least one of the one or more desired user settings and the one or more device settings.

4. The method of claim 1, wherein the machine learning model is one of a least-squares optimal model, a linear regression model, a nonlinear regression model, or a fully-connected feed-forward neural network.

5. The method of claim 1, further comprising:
applying one or more audio post-processes to the gain-scaled audio signal before the audio playback.

6. The method of claim 1, wherein the one or more audio post-processes include at least one of perceptual bass enhancement, equalization, audio upmixing, spatial rendering, and digital-to-analog conversion.

7. The method of claim 1, wherein the peak-level amplitude is estimated without analyzing the entire duration of the input content.

8. The method of claim 1, wherein the loudness metadata is extracted from a header of the audio signal.

9. A system of signal normalization, comprising:
at least one processor; and
a non-transitory processor-readable memory device storing instructions that when executed by the at least one processor causes the at least one processor to perform operations including:
receiving an input content with a corresponding audio signal;
extracting loudness metadata from an audio signal corresponding to the input content;
estimating, using a machine learning model, a peak-level amplitude based on the loudness metadata, wherein the peak-level amplitude represents a maximum linear amplitude of the audio signal over an entire duration of the input content;
determining a gain based at least on the peak-level amplitude; and
applying the gain to the audio signal, wherein the resulting gain-scaled audio signal is provided to one or more speakers coupled to or integrated in an electronic device for audio playback.

10. The system of claim 9, wherein the operations further include:
obtaining one or more desired user settings for the electronic device; and
obtaining one or more device settings representing a preset configuration of the electronic device.

11. The system of claim 10, wherein the gain is further based on at least one of the one or more desired user settings and the one or more device settings.

12. The system of claim 9, wherein the machine learning model is one of a least-squares optimal model, a linear regression model, a nonlinear regression model, or a fully-connected feed-forward neural network.

13. The system of claim 9, wherein the operations further include:
applying one or more audio post-processes to the gain-scaled audio signal before the audio playback.

14. The system of claim 9, wherein the one or more audio post-processes include at least one of perceptual bass enhancement, equalization, audio upmixing, spatial rendering, and digital-to-analog conversion.

15. The system of claim 9, wherein the peak-level amplitude is estimated without analyzing the entire duration of the input content.

16. A non-transitory processor-readable medium that includes a program that when executed by a processor performs a method of signal normalization, the method comprising:
receiving an input content with a corresponding audio signal;
extracting loudness metadata from an audio signal corresponding to the input content;
estimating, using a machine learning model, a peak-level amplitude based on the loudness metadata, wherein the peak-level amplitude represents a maximum linear amplitude of the audio signal over an entire duration of the input content;

determining a gain based at least on the peak-level amplitude; and applying the gain to the audio signal, wherein the resulting gain-scaled audio signal is provided to one or more speakers coupled to or integrated in an electronic device for audio playback.

17. The non-transitory processor-readable medium of claim 16, wherein the method further comprises:

obtaining one or more desired user settings for the electronic device; and obtaining one or more device settings representing a preset configuration of the electronic device.

18. The non-transitory processor-readable medium of claim 17, wherein the gain is further based on at least one of the one or more desired user settings and the one or more device settings.

19. The non-transitory processor-readable medium of claim 16, wherein the machine learning model is one of a least-squares optimal model, a linear regression model, a nonlinear regression model, or a fully-connected feed-forward neural network.

20. The non-transitory processor-readable medium of claim 16, wherein the method further comprises:

applying one or more audio post-processes to the gain-scaled audio signal before the audio playback.

\*　\*　\*　\*　\*